(12) United States Patent
Srikrishna et al.

(10) Patent No.: US 9,077,775 B2
(45) Date of Patent: *Jul. 7, 2015

(54) IDENTIFYING SOCIAL PROFILES IN A SOCIAL NETWORK HAVING RELEVANCE TO A FIRST FILE

(71) Applicant: Python4Fun, Inc., San Mateo, CA (US)

(72) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo ( * ) Notice: Subject to any disclaimer, the term of this patent is extended or adjusted under 35 U.S.C. 154(b) by 0 days.

This patent is subject to a terminal disclaimer.

(21) Appl. No.: 14/088,272

(22) Filed: Nov. 22, 2013

(65) Prior Publication Data

US 2014/0082086 A1     Mar. 20, 2014

Related U.S. Application Data

(63) Continuation of application No. 13/438,266, filed on Apr. 3, 2012, now Pat. No. 8,612,434.

(51) Int. Cl.
*G06F 17/30* (2006.01)
*H04L 29/06* (2006.01)

(52) U.S. Cl.
CPC ........ *H04L 65/403* (2013.01); *G06F 17/30867* (2013.01)

(58) Field of Classification Search
USPC ............................................ 707/732; 726/28
See application file for complete search history.

(56) References Cited

U.S. PATENT DOCUMENTS

| 5,752,020 A | 5/1998 | Ando |
| 6,327,590 B1 | 12/2001 | Chidlovski et al. |
| 6,981,210 B2 | 12/2005 | Peters et al. |
| 7,707,088 B2 | 4/2010 | Schmelzer |
| 8,533,232 B1 | 9/2013 | Hartman et al. |
| 8,612,434 B2 * | 12/2013 | Srikrishna et al. ............ 707/732 |
| 2004/0117732 A1 | 6/2004 | McNeill et al. |
| 2005/0097173 A1 | 5/2005 | Johns et al. |
| 2005/0216429 A1 | 9/2005 | Hertz et al. |
| 2006/0271561 A1 | 11/2006 | Schlachta-Fairchild et al. |
| 2007/0288455 A1 | 12/2007 | Hsu |
| 2008/0109808 A1 | 5/2008 | Wing et al. |
| 2008/0263103 A1 | 10/2008 | McGregor et al. |
| 2009/0265737 A1 | 10/2009 | Issa et al. |
| 2009/0287655 A1 | 11/2009 | Bennett |
| 2009/0292685 A1 | 11/2009 | Liu et al. |
| 2010/0145958 A1 | 6/2010 | Duffy et al. |
| 2011/0035674 A1 | 2/2011 | Chenoweth et al. |

(Continued)

*Primary Examiner* — Etienne Leroux
(74) *Attorney, Agent, or Firm* — Brian R. Short

(57) ABSTRACT

Methods and systems for providing related social profiles in a social network are disclosed. One method identifying a plurality of social profiles within the social network, wherein the plurality of social profiles each have a relationship with the first file, wherein the social network allows uploading and sharing of social profiles of users, and wherein each social profile includes a representation of a user. The method further includes generating, by a system server, a list of inquiries based on the plurality of social profiles, providing, by the system server, the list of inquiries to at least one author of the first file, receiving from the at least one author at least one response to the list of inquiries, selecting a subset of the plurality of social profiles based on the at least one response, and storing information related to the selected subset of the plurality of social profiles for access if the first file is selected.

20 Claims, 10 Drawing Sheets

(56) References Cited

U.S. PATENT DOCUMENTS

| | | |
|---|---|---|
| 2011/0087658 A1 | 4/2011 | Lunt |
| 2011/0096014 A1 | 4/2011 | Fuyuno et al. |
| 2011/0119243 A1 | 5/2011 | Diamond et al. |
| 2011/0161345 A1 | 6/2011 | Dworkin et al. |
| 2011/0231104 A1 | 9/2011 | Lambert |
| 2011/0307491 A1 | 12/2011 | Fisk |
| 2011/0314049 A1 | 12/2011 | Poirer et al. |
| 2012/0066201 A1 | 3/2012 | Suman et al. |
| 2012/0078945 A1 | 3/2012 | Hurst |
| 2012/0084629 A1 | 4/2012 | Patrawala et al. |
| 2012/0113273 A1 | 5/2012 | Rothschild |
| 2012/0131683 A1* | 5/2012 | Nassar et al. .......... 726/28 |
| 2012/0158747 A1 | 6/2012 | Satow et al. |
| 2012/0221687 A1 | 8/2012 | Hunter et al. |
| 2012/0233152 A1 | 9/2012 | Vanderwende et al. |

* cited by examiner

200

Are any of the following updates to World Wide Web relevant to your paper? (i.e. Chronic Obstructive Pulmonary Disease : Effects beyond the Lungs) 202

● Yes, some of them are relevant     ◎ No, none of them are relevant     208   204   206

Check all that apply – if checked use the text box below them to explain why it is related Microalbuminuria and hypoxemia in patients with chronic obstructive pulmonary disease.(2010 Oct 15 PubMed) Found using (Celli) AND ("stable patients") - Albert Einstein, Professor of Physics, Princeton University, albert.einstein@princeton.edu, 113 Market St. Princeton, NJ   218

| X | Relevant systemic effect |

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics, 212 oppenheimer@ucberkeley.edu, University of California, 145 Main Street, Berkeley   220

216  Directly Relevant

☐ Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge , MA

210

| X | Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ

214

☐ The link between periodontal disease and cardiovascular disease: How far we have come in the last two decades? (2010 Jul 11 PubMed) using ("link between COPD") AND ("Review 222 obstructive pulmonary")-William Shockley, Professor of Physics, william.shockley@mit.edu, Massachusetts Institute of Technology, 444 El Camino Real, Cambridge , MA

FIGURE 2

Are any of the following updates to PubMed relevant to your paper? (i.e. Chronic Obstructive Pulmonary Disease : Effects beyond the Lungs)

- ● Yes, some of them are relevant     ◎ No, none of them are relevant     202
- 204     212     214     206

Check all that apply – if checked use the text box below them to explain why it is related

- [X] Chronic obstructive pulmonary disease and lung cancer at the end of life (2010 May 22 PubMed)-Albert Einstein, Professor of Physics, Princeton University, albert.einstein@princeton.edu, 113 Market St. Princeton, NJ

218

| Related topic |

216     222

- [ ] Experimental pulmonary infection and colonization of Hemophilic influenzae in emphysematous hamsters (2010 Aug PubMed) Oppenheimer, Professor of Physics, oppenheimer@ucberkeley.edu, University of California, 145 Main Street, Berkeley

210

220

312

- [ ] Pulmonary hypertension related to pulmonary diseases or hypoxia and its treatment (2010 Sep PubMed)    Shockley, Professor of Physics, william.shockley@mit.edu, Massachusetts Institute of Technology, 444 El Camino Real, Cambridge , MA

- [ ] Systemic diseases and the elderly. (2010 Sep PubMed) Shockley, Professor of Physics, william.shockley@mit.edu, Massachusetts Institute of Technology, 444 El Camino Real, Cambridge, MA

- [X] Chronic obstructive pulmonary disease and its comorbidities (July 2011, PubMed)Albert Einstein, Professor of Physics,Princeton University, albert.einstein@princeton.edu, 113 Market St. Princeton, NJ

IDENTIFYING SOCIAL PROFILES IN A SOCIAL NETWORK HAVING RELEVANCE TO A FIRST FILE

RELATED APPLICATIONS

This patent application is a continuation of U.S. patent application Ser. No. 13/438,266 filed on Apr. 3, 2012, and granted as U.S. Pat. No. 8,612,434 on Dec. 17, 2013, which is herein incorporated by reference.

FIELD OF EMBODIMENTS

The described embodiments relate generally to search results. More particularly, the described embodiments relate to methods, and systems for identifying social profiles in a social network having relevance to a first file.

BACKGROUND

In a social network, search engines use a variety of search techniques to present social profiles to users based on one or more search terms, which are provided by the users. The relevance of the search results relate closely to the search terms. Selection of a profile from the search results in the search engine of a social network provides a list of social profiles related to the selected social profile. Users who like to read more about the related subject matter use the results suggested by the author or the search engine itself. For documents published after the publication date of the selected document, users have to rely on the search engine to provide a relevant list. The documents suggested by search engines are based on the search engine's algorithm. The search engine generally produces a large number of documents, which include some irrelevant results and are difficult to sort for relevant documents. Many suggested documents are not relevant to the user. Relevant results are not always provided.

It is desirable to have methods and systems for providing an up-to-date list of documents related to the selected document relevant to the subject matter of the selected document in a social network.

SUMMARY

One embodiment includes a method of identifying one or more social profiles in a social network related to a first file. The method includes identifying a plurality of social profiles within the social network, wherein the plurality of social profiles each have a relationship with the first file, wherein the social network allows uploading and sharing of social profiles of users, and wherein each social profile includes a representation of a user. The method further includes generating, by a system server, a list of inquiries based on the plurality of social profiles, providing, by the system server, the list of inquiries to at least one author of the first file, receiving from the at least one author at least one response to the list of inquiries, selecting a subset of the plurality of social profiles based on the at least one response, and storing information related to the selected subset of the plurality of social profiles for access if the first file is selected.

Another embodiment includes providing the list of inquiries to more than one author. In another embodiment, a different list of inquiries is provided to a first author and other authors. The identified social profiles are ranked based on the responses from all the authors and a subset of social profiles is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the authors.

FIG. 3 is another example list of inquiries presented to the authors.

DETAILED DESCRIPTION

The described embodiments are embodied in methods, and systems for providing a set of social profiles to a user in a social network, where the set of social profiles have relevance to the first file from a search or retrieval of a record identifying the first file.

Figure 1:
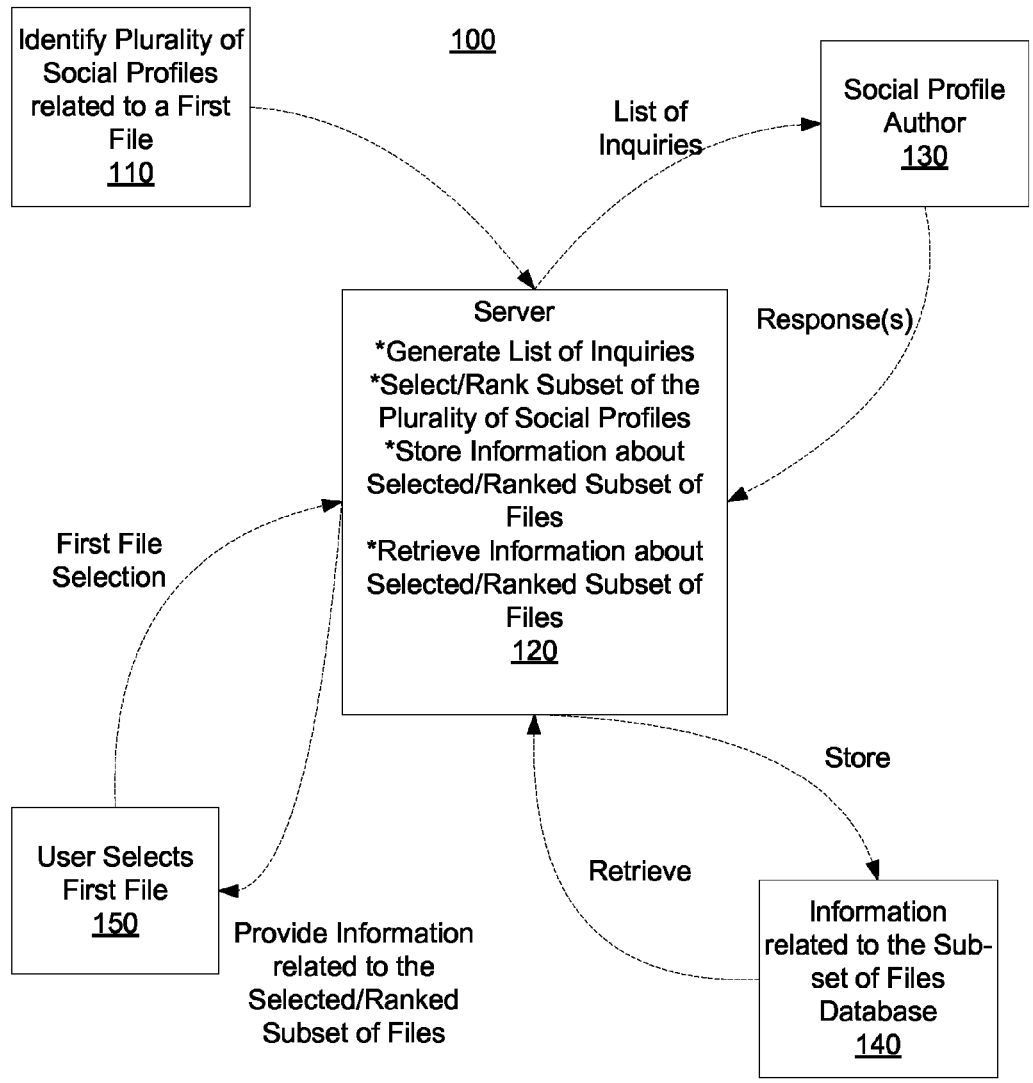
FIG. 1 is a block diagram of an embodiment of a system of providing related social profiles from a social network, where an author provides input to selecting/ranking a subset of social profiles.

FIG. 1 is a block diagram of an embodiment of system 100, a system of providing related social profiles in a social network, where an author is involved in selecting/ranking a subset of social profiles.

Enterprises create shared social networks for various business activities. Users can upload social profiles and share the social profiles immediately without the need to email or transport using portable storage drives. For at least some embodiments, the social network allows uploading and sharing of social profiles of users, and each social profile includes a representation of a user. In an embodiment, the shared social profiles have read or read and write privileges. Researchgate®, Academia®, LinkedIn®, Facebook®, Biomedexperts®, Quora®, Stackoverflow®, Chatter® and Jive® are examples of social networks. In the described embodiments, social network is an online service focusing on building network among people who share interests and/or activities. A social network consists of a representation of each user by a social profile and the user's social links and a variety of additional services. Social network also provides a platform for interaction with other users via e-mail and instant messaging.

The social network stores social profiles in different formats not limited to word document, power point presentations, portable document format (pdf), spreadsheets, photos and videos. In one embodiment of a social network, a user may contribute to the social profile system. In an embodiment, any user may edit a social profile similar to a wiki. In another embodiment, write privilege to a social profile may be assigned to a certain group of users such as team of users or a team of people working on a project.

In an embodiment, a first file may be information describing a person's interests in the social network such as Facebook® or research papers by an author listed on the social profile in a social network such as Researchgate® or Academia® identified to generate a list of related social profiles. In another embodiment, a first file may be answers given by the author to questions in social networks such as Quora® or Stackoverflow®, or expert profiles posted in enterprise social networks such as Chatter® or Jive® identified to generate a list of related social profiles. In several embodiments, the first file may be a recently added social profile to the social network, or identified due a large number of social profiles added to the social network in the same subject matter, or identified automatically for a periodic update of related social profiles, or identified by any other method. It is to be understood that for various embodiments, the first file includes at least one of a web page, a document, an article, a social profile, a message, a message thread, a conversation, a video file, an audio file, or a picture file. It is also to be understood that this is not an exhaustive list.

At least some embodiments of the social network are updated constantly as users add social profiles to the social network. As the number of social profiles grows large, the existence of the social profile may not be known to many users if relevant hyperlinks to other social profiles are not created. Creating hyperlinks is a manual task and often few social profiles are linked together in a social network. Search engines provide access to the social profiles that are not linked.

Many author/authors list references to social profiles of other users with related interests in their social profiles. The social profiles referenced by author/authors are generally more relevant than the machine generated references. Unlike machine generated references using an algorithm running on a computer, the judgment of human users in selecting reference profiles is uniquely valuable to other readers due to the author's intrinsic understanding and motivation to identify materials related to the social profile written by that user. In general, an author or expert has greater interest and more precise understanding of the subject matter compared to other readers. In several embodiments, a social profile author is the author of a social profile, an expert on the subject matter or a team member or a person who is identified for correspondence related to the social profile or listed in the metadata of the profile anyone who has write-privilege to the profile.

Search engines list social profiles that may be related to a first file that may be published before or after the first file has been published. When a social profile is selected from the search results, a set of possibly related social profiles is generally presented by search engines. The list may not always be accurate. For example, when asked to evaluate the accuracy of the list of related social profiles, an author of the first file or expert on the subject matter of the first file may not always concur with the relationship of all the social profiles presented in the list of related social profiles provided by the search engine. Therefore, lists of possibly related social profiles produced by search engines may contain some social profiles that are actually related (true-positives) and some that are unrelated in practice (false-positives). The set of related social profiles produced by a search engine are based on some criteria such as the number of hyperlinks a social profile has, common subject matter, and the frequency of certain phrases. The number of hyperlinks to a social profile is one of the criteria used by search engines to rank it in search results to make it visible to users searching for it. If a social profile has no hyperlinks, a social profile that is actually related may be missing from the list of related social profiles presented by the search engine (false-negatives). The list of related social profiles presented by a search engine can be improved by surveying an expert or author to recommend the related social profiles and eliminate false-positives and false-negatives. The method of semi-automating the presentation of a list of related social profiles using surveys is described in the embodiments.

For at least one embodiment, a set of social profiles related to the first file is identified in social network 110 by server 120. In one embodiment, identifying in social network 110 includes server 120 identifying a set of social profiles related to the first file and receiving the list of identified social profiles. In another embodiment, identifying in social network 110 includes server 120 receiving the list of identified social profiles. The set of identified social profiles 110 can be the output of natural language search, or text analysis, or from filtering, or any other search technique. The search can be based on a string of words, or a picture or an author. The set of social profiles is derived based on a relationship with the first file. The relationship can be any one of or some of author of the first file, author of the references cited in the first file, frequently used noun phrases, publication date later than the first file, a specific publication date, or a publication date after a specific date. Social profiles published from an author tend to have common subject matter. Frequently used nounphrases in the first file are also keywords for searching related social profiles. However, the number of occurrences of specific noun phrases in the social network system may change with technology or over a period. Many search engines may not have the intelligence to recognize the changing noun phrases over a period. In some embodiments, the full-text of the social profile is used for searching to yield more relevant related social profiles. Social profiles with publication date later than the first file are valuable as users are generally interested in recent updates. In an example, a search engine operating on server 120 uses Facebook Graph® API to identify post-publication updates to profiles in Facebook®, based on noun phrases in full-text. The algorithm used to generate the search terms using Facebook Graph® API automatically extracts noun phrases from a social profile using natural language processing tools and ranks them by the number of occurrences in the social profile compared to the number of occurrences on the web.

In an embodiment, link-validation is used to generate the list of related documents 110. Link-validation is defined as search results from queries where the queries are present in one or more links provided by the author in their social profile. Link-validated search terms improve the relevance of the search results compared to search terms that are not present in the links. The links can written by the same authors as the social profile or written by different authors.

For an embodiment, a server 120 generates a list of inquiries based on the set of social profiles related to the first file. In an embodiment, the list of inquiries includes questions asking the author whether the social profiles are relevant to the first file, and the search terms used in keyword search or noun-phrase used to select the social profile.

FIG. 2 shows example 200, an inquiry generated using keyword search by Facebook Graph® API in Facebook®. The selection of keyword search results displays related social profiles. Example 200 shows the related social profiles from keyword searches. In example 200, 202 is the title of the first file. The first question summarizes the inquiry about relevant social profiles. 204 is a check box next to a related social profile selected by a search engine. 206 is the publication date of the related social profile. 208 is the search term used to identify the related social profile. 210 is an input box for the author to enter the reason for the social profile being relevant. 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying meta-data such as the sender's name, address, or contact information.

FIG. 3 shows example 300 generated using Facebook® Facebook Graph® API to obtain related citations in Facebook® and display the social profiles published after the first file. In the described embodiments, a single ranked list of Facebook® profile that are related are derived from text-analysis of profiles is referred to herein as Facebook® Related-Profiles. For each word or term in each profile, a numeric weight is computed based on the number of times the word occurs in the profile and the number of profiles that the term occurs in within Facebook®. The numeric-weight is used to find the most similar pairs of profiles. 312 is the title of the document obtained from related citations.

For an embodiment, again referring to FIG. 1, a social profile author 130 is notified of the list of inquiries generated by server 120. In the described embodiments, the notification can be sent electronically. In an embodiment, the notification email contains a link to a webpage that contains the list of inquiries. In another embodiment, the email contains the text of the inquiries. In another embodiment, the notification is sent by an email or message on a social network such as Facebook® or instant message system. In another embodiment, the notification is sent from a web-based interface such as Jive®, or LinkedIn® or Google Docs®. The author of the social profile completes the inquiry by selecting one or more social profiles related to the first file in the opinion of the author, and sends the response to the server using any of the notification methods described in several embodiments above. Server 120 receives the response to the inquiry from the social profile author and processes the response. The response includes a selection of social profiles related to the first file. In an embodiment, the response includes a ranked list of the related social profiles, identifying the relevance of the related social profiles to the first file.

In an embodiment, social profiles selected by the social profile author are ranked higher than the social profiles not selected by the social profile author. In an embodiment, a subset of the ranked social profiles is selected. In another embodiment, all social profiles selected by social profile author 130 are selected. In another embodiment, a certain number of ranked social profiles are selected. Server 120 creates a hyperlink between the first file and the subset of selected/ranked social profiles in the social network. The hyperlink influences future search results of the engine when the first file or any of the subset of social profiles is involved. Server 120 stores information about the subset of related social profiles in a social network in database 140. The information includes one or more of hyperlinks to the related social profiles, ranking of the social profiles, the author of the first file, and metadata of the social profiles. In the described embodiments, hyperlinks are references to social profiles that connect the users to another social profile or a portion of the social profile. In another embodiment, database 140 is a separate storage. When a user selects (150) the social profile identifier from search results or any other listing, server 120 retrieves information about the selected/ranked related social profiles. In several embodiments, the author is presented with a list of information about the related social profiles shown in FIG. 2 and FIG. 3. In one embodiment, the identity of the authors of the social profiles who selected each social profile is revealed to the user by displaying meta-data such as the author's name, institution, and qualifications.

Figure 4:
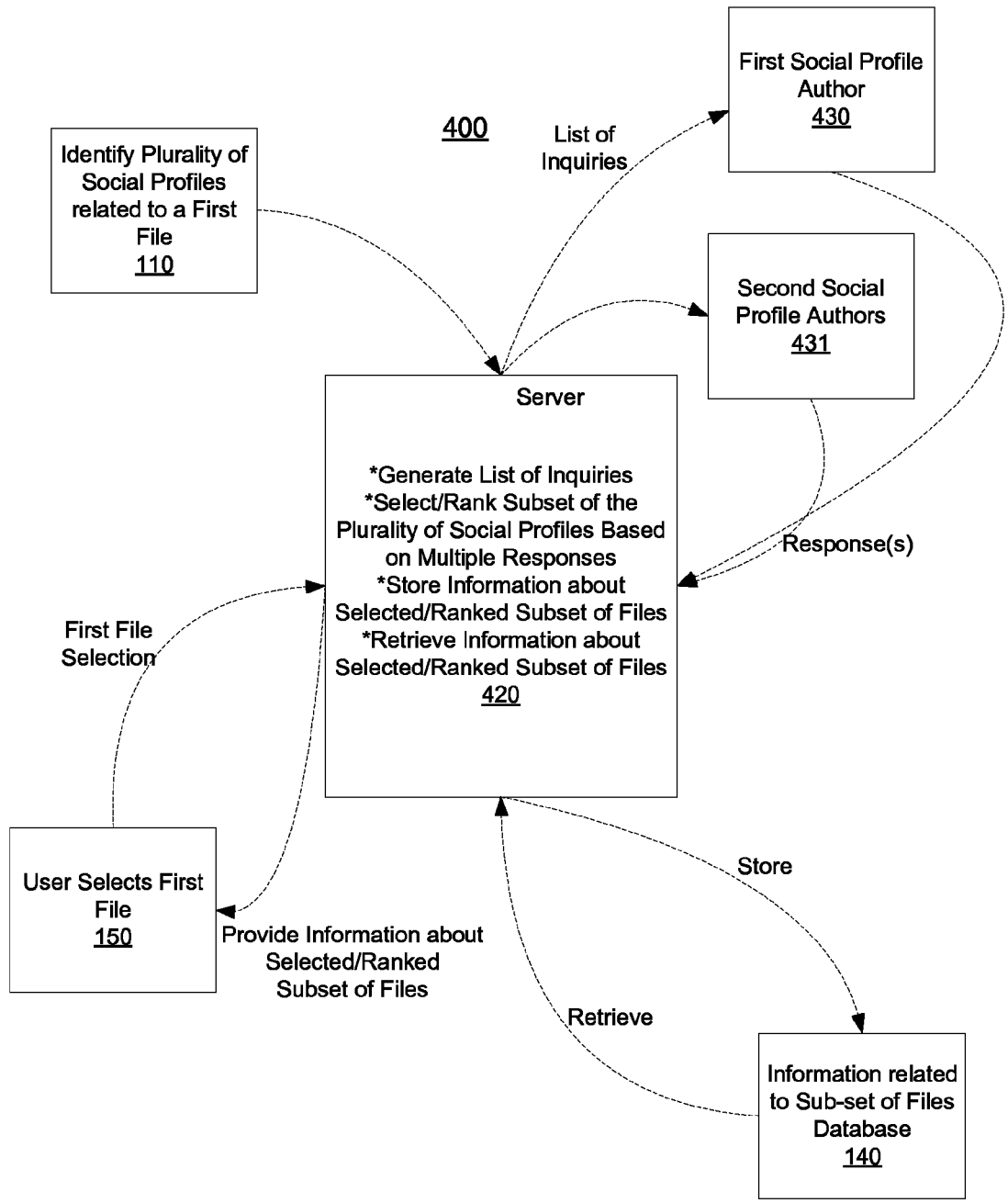
FIG. 4 is a block diagram of an embodiment of a system of providing related social profiles, where more than one author provides input to selecting/ranking a subset of social profiles.

FIG. 4 is a block diagram of an embodiment of system 400, a system of providing related social profiles, where more than one social profile author provides input to selecting/ranking a subset of social profiles. A set of social profiles related to the first file 110 is identified in social network by server 420. For at least some embodiments, the set of social profiles is derived based on a relationship such as author, frequently use noun-phrases, and common subject matter with the first file. For an embodiment, a server 420 generates a list of inquiries based on the set of social profiles related to the first file. In an embodiment, the list of inquiries includes questions asking the social profile authors whether the related social profiles are relevant to the first file as determined by the search engine.

For at least one embodiment, the list of inquiries generated by server 420 is notified to the first social profile author 430. In at least some of the described embodiments, a first social profile author is the author of the first file, an expert on the subject matter or a team member or anyone who has write-privilege to the first file. The list of inquiries is also notified to second social profile author 431. In at least some of the described embodiments, the second social profile author is one or more social profile author other than the first social profile author. The first and second social profile authors are notified electronically as described in conjunction with FIG. 1. Server 420 receives responses from the first social profile author as well as the second social profile authors. The response includes a selection of social profiles related to the first file. In an embodiment, the response includes a ranked list of the related social profiles, identifying the relevance of the related social profiles to the first file. In an embodiment, social profiles are ranked based on the number of selections from the first and the second social profile authors. In an embodiment, the social profiles selected by the first social profile author are ranked higher than the social profiles selected by second social profile authors. In another embodiment, all responses are ranked with the same weight. In another embodiment, a certain number of ranked social profiles are selected. In another embodiment, all social profiles selected by the first social profile author and the second social profile authors are selected.

For at least some embodiments, information about the selected/ranked social profiles is stored in database 140. User selection of the first file identifier 150 from search results or any other listing is sent to server 420. In several embodiments, server 420 retrieves information about the selected/ranked list of related social profiles from the social network before presenting to the user shown in FIG. 2 and FIG. 3. In one embodiment, the identity of the social profile author s who selected each social profile is revealed to the user by displaying meta-data such as the social profile author's name, institution, and qualifications.

Figure 5:
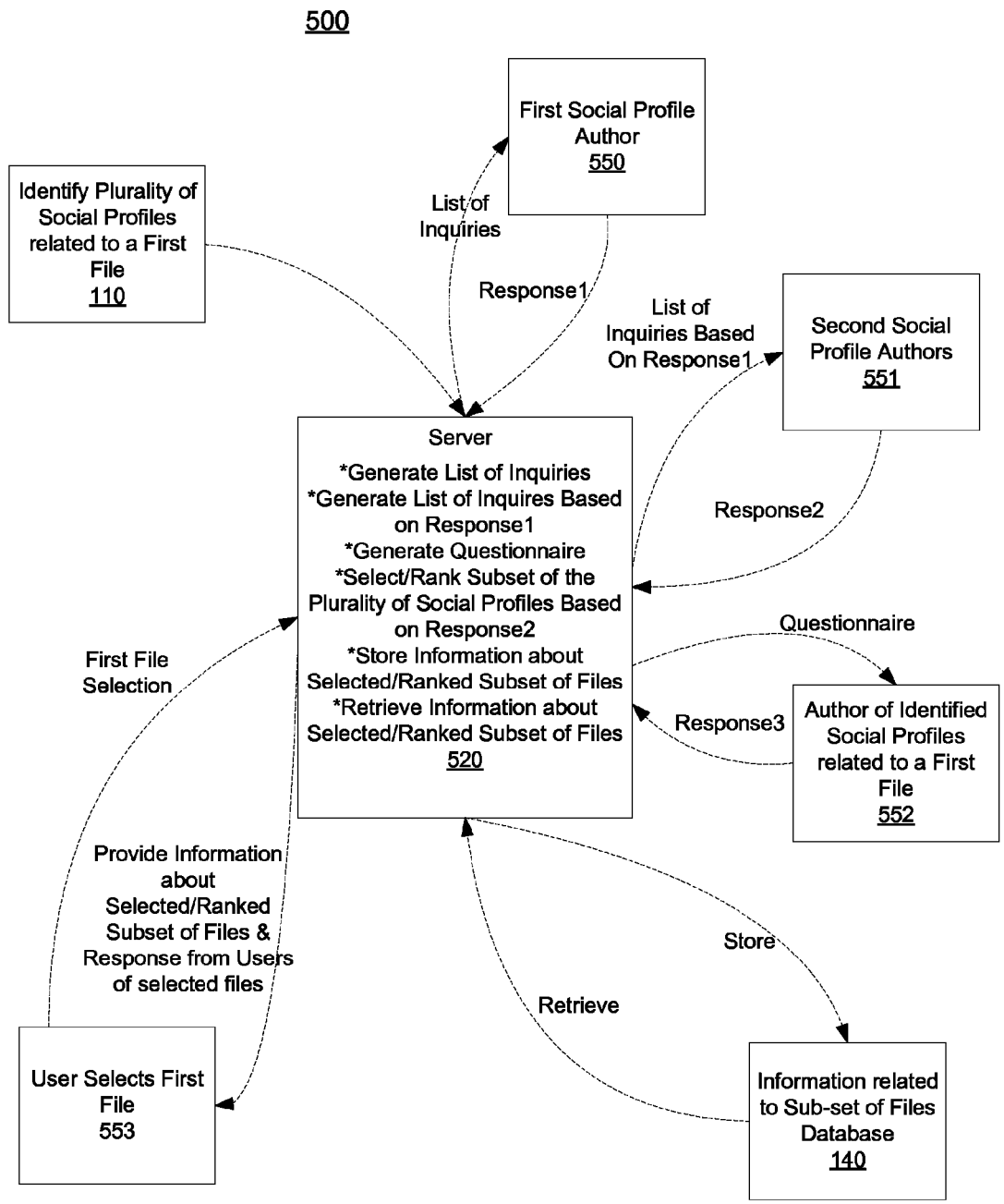
FIG. 5 is a block diagram of an embodiment of a system of providing related social profiles in a social network, where more than one author is involved in the selecting/ranking a subset of social profiles and more than one list of inquiries is generated.

FIG. 5 is a block diagram of an embodiment of system 500, a system of providing related social profiles, where more than one author provides input to selecting/ranking a subset of the social profiles and more than one list of inquiries is generated.

For this embodiment, one or more social profiles related to a first file are identified by server 520 in a social network (similar to the description in conjunction with FIG. 1). A list of inquiries is generated by server 520 based on the social profiles related to the first file. The list of inquiries includes questions asking the relevance of the related social profile to the first file. The list of inquiries is notified to a first author 550. A first response is received from first author 550 by server 520. The first response includes selection of social profiles that are related to the first file in the opinion of the first social profile author 550. In an embodiment, the first response includes a ranked list of the related social profiles, identifying the relevance of the related social profiles to the first file. A second list of inquiries is generated based on the first response. The second list of inquiries includes questions about the selection of the social profiles related to the first file by the first social profile author. In an embodiment, the second list of inquiries includes one or more of the selection of related social profiles by the first social profile author, the publication date, the abstract, the unique identification number, the search terms used to identify the related social profile or the noun-phrases used to identify the social profiles, or the noun-phrases in the links of the first file.

For at least some embodiments, second authors 551 are notified electronically (by methods discussed in conjunction with FIG. 1) with the second list of inquiries. Server 520 receives the second response from second social profile authors 551 and analyzes the second response. The second response further refines the machine generated search results. The second response includes a selection of social profiles related to the first file. In an embodiment, the second response includes a ranked list of the related social profiles, identifying the relevance of the related social profiles to the first file.

In an embodiment, server 520 generates a questionnaire based on identified social profiles related to the first file 110. The questionnaire includes the opinion of the social profile author of the identified social profiles about the selection as a related social profile to the first file. The questionnaire is notified to the social profile authors of identified social profiles 552. Server 520 receives response3 from the authors of identified social profile 552. In an embodiment, server 520 ranks an identified social profile based on the number of selections from second social profile authors 551 and the selection from the author of identified social profile 552. A subset of the ranked related social profiles is selected. In an embodiment, all social profiles selected by second social profile authors are selected. In another embodiment, related social profiles receiving a certain rank are selected. Information related to the selected/ranked social profiles is stored in social network 140. In an embodiment, the information related to the selected/ranked social profile includes one or more of hyper-link to the selected social profile, the author of the selected social profile, the title of the selected social profile, the social profile authors, the opinion of the author of the selected social profile, opinion of the authors of the first file, institution of the social profile author, the published date, and the selection/rank date. When a user selects the first file identifier 553, server 520 retrieves the information related to the selected related social profiles from social network 140. In several embodiments, information related to the subset of selected/ranked social profiles is presented to the user shown in FIG. 2 and FIG. 3. In one embodiment, the identity of the social profile authors who selected each social profile is presented to the user by displaying meta-data such as the social profile author's name, institution, and qualifications. In another embodiment, information about the opinion of the social profile author of the selected social profile is presented to the user.

Figure 6:
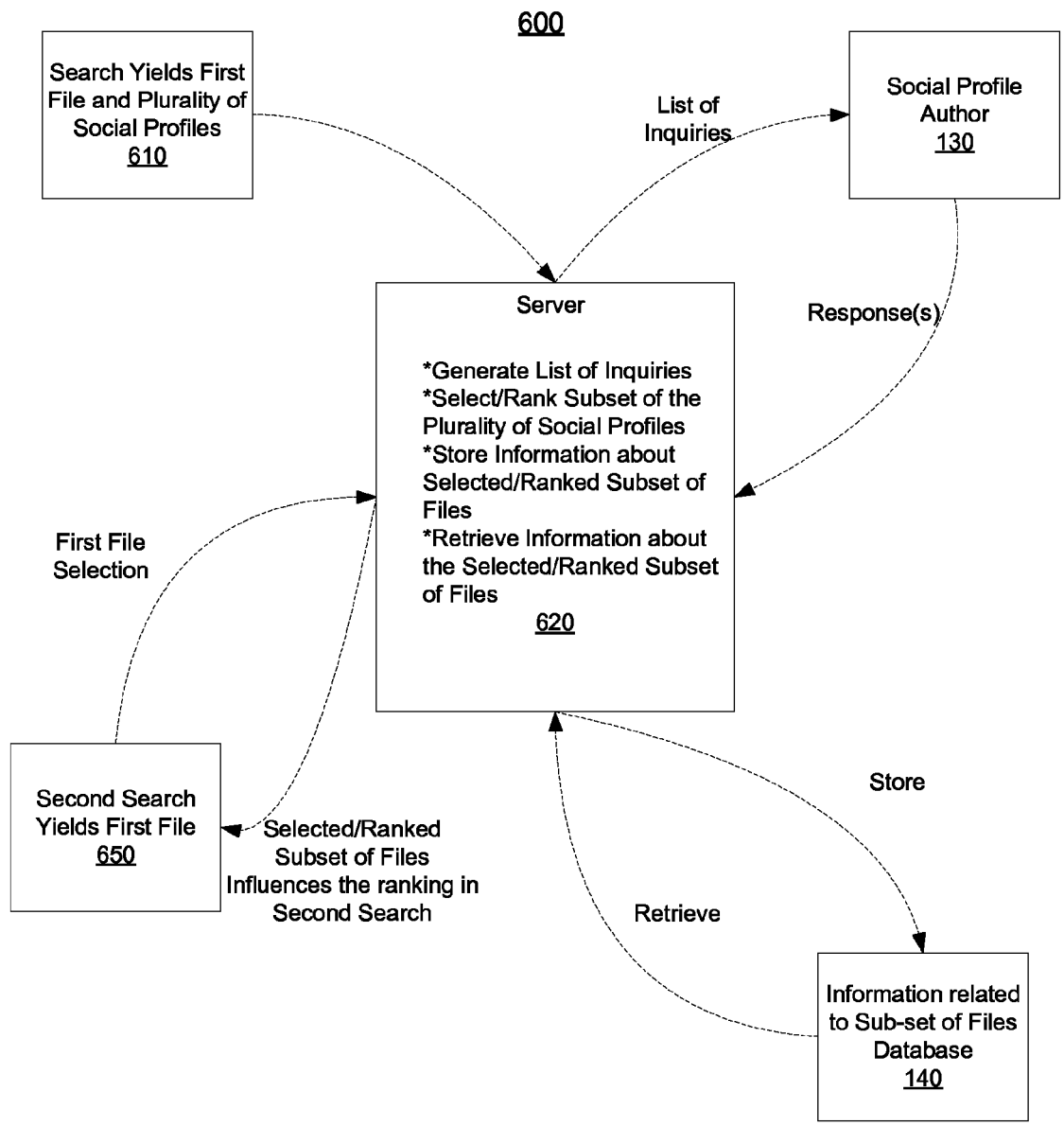
FIG. 6 is a block diagram of an embodiment of a system of providing related social profiles, where an author provides input to selecting/ranking a subset of social profiles, where a search yields a first file.

FIG. 6 is a block diagram of system 600, an embodiment of a system of providing related social profiles, where a social profile author is involved in the selecting/ranking a subset of social profiles, where a search yields a first file. Server 620 searches for a first file in the social network of the enterprise. The search engine outputs a list of social profiles 610 related to the first file based on search techniques described in conjunction with FIG. 1. Server 620 generates a list of inquiries based on the list of related social profiles. The list of inquiries includes questions whether each of the social profiles from search results are relevant to the first file.

The list of inquiries is notified to the author of the social profile 130. A response is received from the social profile author. The response includes a selection of social profiles related to the first file and optionally the reason for relevancy in the social profile author's opinion. In an embodiment, the response includes a ranked list of the related social profiles, identifying the relevance of the related social profiles to the first file. Server 620 ranks the related social profiles based on the response from the social profile author. A subset of the ranked related social profiles is selected. Server 620 stores information about the subset of selected/ranked social profiles in database 140. When a second search yields a plurality of search results containing the information identifying first file 650, server 620, retrieves the stored information about the subset of selected/ranked social profiles and influences the ranking of the first file relative the search results when presenting the search results to the user. In one embodiment, the identity of the social profile authors who selected each social profile is revealed to the user by displaying meta-data such as the author's name, institution, and qualifications.

Methods

Figure 7:
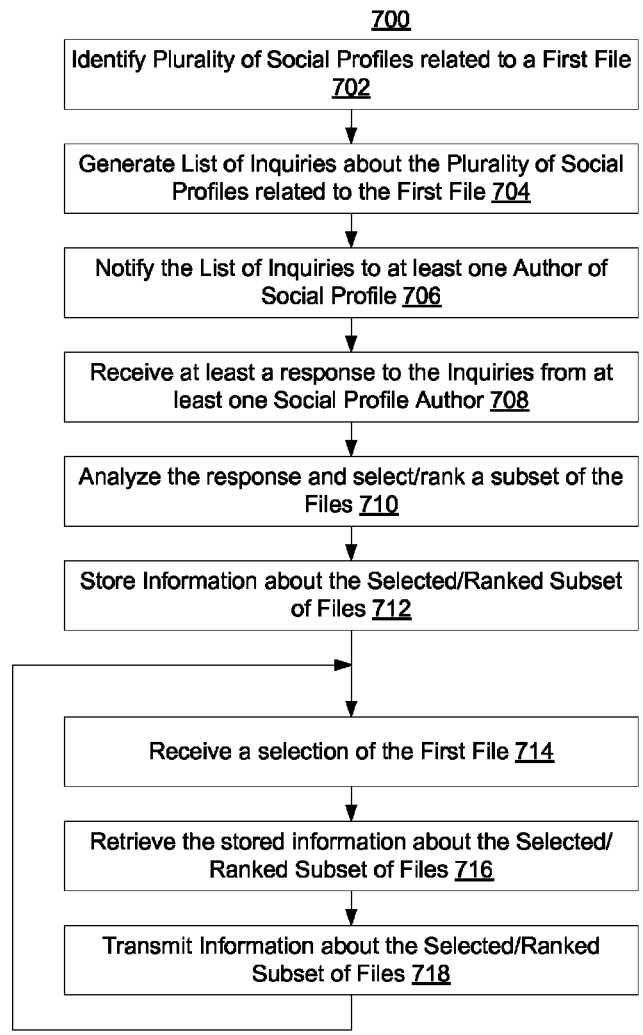
FIG. 7 is a flowchart that includes the steps of an example of a method of providing related social profiles in a social network, where one or more authors provide input to selecting/ranking a subset of social profiles.

FIG. 7 is a flowchart that includes the steps of an example of a method of providing related social profiles, where a social profile author is involved in the selecting/ranking a subset of social profiles. In step 702, the social network is searched to identify one or more social profiles that are related to a first file. For at least some embodiments, the search is based on any of or all of natural language search, machine language search, text analysis, or filtering. For at least some embodiments, the social network is searched for keywords that are automatically generated by the server. The keywords may be the author/authors of the first file, frequently appearing words, authors of cited references in the first file, noun phrases based on subject matter, and title. In an embodiment, the search is conducted on the full-text of the social profile. In another embodiment, only the abstract and the title are searched. In an embodiment, only social profiles published after the first file's published date are searched. In an embodiment, the algorithm used to generate the search terms using Facebook Graph® API automatically extracts noun phrases from the first file using natural language processing tools and ranks them by the number of occurrences in the social profile compared to the number of occurrences on the web. In an embodiment, citation-validation is used to generate the list of related social profiles to improve the quality and relevance of the search results.

In step 704, the server generates a list of inquires based on the search results of step 702 to access the relevancy of the search result. The list of inquiries includes questions about each related social profile. In an embodiment, the inquiries list the title of one or more social profiles identified in the search, the publication date, and the search terms used to identify the social profile. Other embodiments may not list all the above items. FIG. 2 and FIG. 3, show an example of the list of inquiries presented to authors. In step 706, the list of inquiries is notified to at least one author of the first file. In the described embodiments, the notification can be sent electronically by an email, or a message on a social network or instant message. Web based interface is another method of notifying the social profile author.

In step 708, method 700 receives at least one response to the list of inquiries from the social profile authors. The response includes a selection whether any of the social profiles are relevant to the first file. If any of the social profiles are relevant, a selection of the relevant social profile and optionally the reason for the social profile being relevant is received by the server. In an embodiment, the response includes a list of the related social profiles, identifying the relevance of the related social profiles to the first file. In step 710, method 700 analyzes the responses from the social profile authors. The related social profiles are ranked based on the number of selections received from the social profile authors. A subset of the ranked related social profiles is selected. In an embodiment, all social profiles selected by the social profile authors are selected. In another embodiment, a certain number of ranked social profiles are selected. In another embodiment, social profiles receiving certain rank are selected. Method 700 creates a hyperlink between the first file and the selected/ranked subset of social profiles. The hyperlink can influence the search results in the social network when the first file is involved. In step 712, information about the selected/ranked social profiles related to the first file is stored. The information about the selected/ranked social profiles includes at least one of hyperlinks to the social profiles in the social network, the rank of each social profile in the selected subset, metadata of the social profiles. The information may be stored on the social network or any other storage system.

Steps 702-712 are performed to generate a list of selected/ranked social profiles that may be more relevant than the machine generated referenced. In an embodiment, steps 702-712 are performed once. In another embodiment, steps 702-712 are performed at certain fixed intervals. In another embodiment, events such as addition of a certain number of social profiles or a manual intervention may trigger steps 702-712.

In step 714, method 700 receives a selection of the first file identifier or information about the first file from a user. The social profile or information about the social profile may be selected from search results or from a list of social profiles. The server retrieves the stored information about the selected/ranked social profiles in step 716. In several embodiments, information about the related social profiles is displayed to the user in step 718 as shown in FIG. 2 and FIG. 3. In one embodiment, the identity of the authors who selected each social profile is revealed to the user by displaying meta-data such as the author's name, institution, and qualifications. Steps 714-718 are performed when a user selects the first file for display.

In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
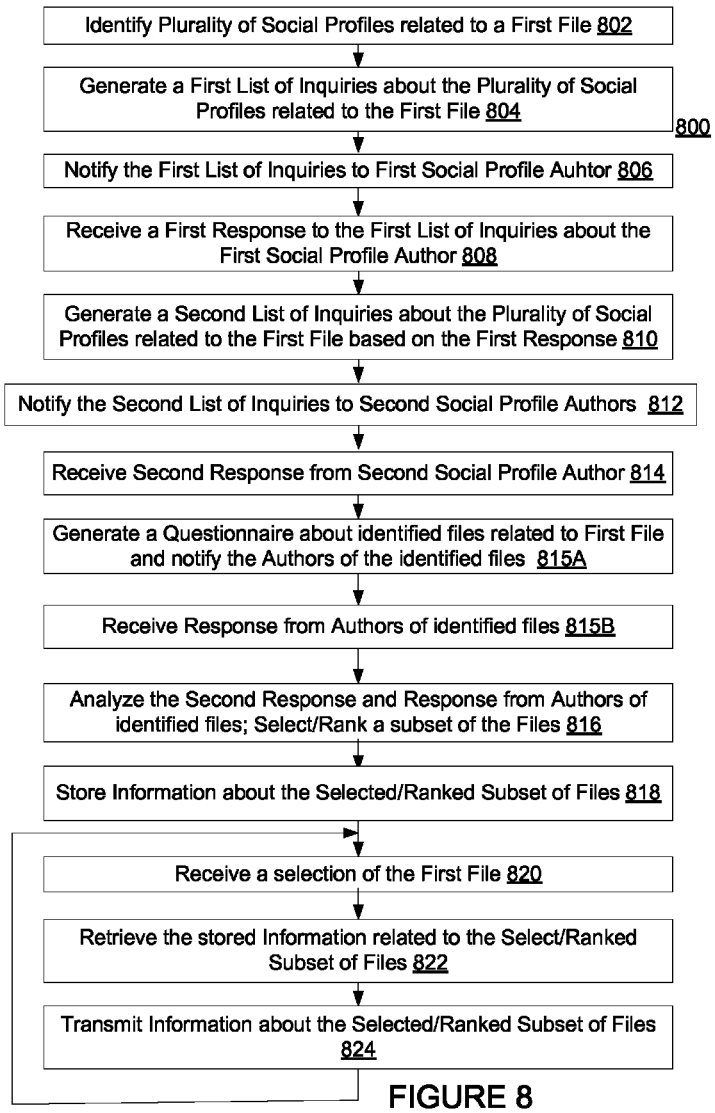
FIG. 8 is a flowchart that includes the steps of an example of a method of providing related social profiles in a social network, where more than one list of inquiries is generated and more than one author is involved in the selecting/ranking a subset of social profiles.

FIG. 8 is a flowchart that includes the steps of an example of a method 800 of providing a list of related social profiles, where more than one list of inquiries is generated and more than one social profile author is involved in the selecting/ranking a subset of social profiles. In this method, at least two distinct lists of inquiries are generated, the first list of inquiries is sent to the first social profile author and the second list of inquiries is sent to the other social profile authors. The second list of inquiries is generated based on the response from the first social profile author.

In method 800, a set of one or more social profiles related to a first file is identified in step 802. In step 804, a first list of inquiries about the set of social profiles identified in step 802 is generated. The first list of inquires includes questions whether each of the identified social profiles are related to the first file and optionally why they are related. In the described embodiment, steps 802 and 804 are similar to steps 702 and 704 respectively. The first list of inquiries is notified to a first social profile author of the first file in step 806. A first response to the first list of inquiries is received in step 808. The response includes a selection of social profiles related to the first file and optionally the reason for the selection. In step 810, a second list of inquires based on the response from the first social profile author about the relevance of the set of social profiles to the first files is generated. In an embodiment, the second list of inquiries includes a list of social profiles selected by the first social profile author for selecting social profiles related to the first file. In an embodiment, the second list of inquires includes questions whether the second social profile author agrees with the first social profile author. In another embodiment, the second list of inquiries includes the reason for a social profile being relevant to the first file.

One or more second social profile authors of the first file are notified with the second list of inquiries in step 812. In step 814, one or more second responses is received from the second social profile author s 551. In an embodiment, a questionnaire is generated based on the list of identified social profiles in step 815A. The questionnaire includes whether the identified social profile is related to the first file. The questionnaire is notified to one or more authors of the plurality of identified social profiles. In step 815B, server 520 receives response from one or more authors of the plurality of identified social profiles.

In step 816, the second response from the second social profile authors in analyzed. In an embodiment, the response from one or more authors of the plurality of identified social profiles is analyzed. In an embodiment, social profiles are ranked based on the number of selections from the second authors. In another embodiment, social profiles are ranked based on the response from authors of identified social profiles in addition to the response from second social profile authors. In an embodiment, the response includes identifying the relevance of the related social profiles to the first file. In an embodiment, social profiles are ranked based on the number of selections from the second social profile authors. In another embodiment, the ranking of a social profile is also based on the opinion of the author of the identified social profile. A subset of the ranked social profiles is selected. In an embodiment, all social profiles selected by the second social profile authors are selected. In another embodiment, a certain number of ranked social profiles or social profiles with a certain rank are selected. Method 800 creates a hyperlink between the first file and the selected/ranked subset of social profiles. The hyperlink can influence the search results in the social network when the first file is involved. In step 818, information related to the selected/ranked subset of social profiles related to the first file is stored in a social network. The information includes one or more of hyperlink to the selected social profile, opinion of the social profile authors, opinion of the authors of the selected social profile, the institution of the social profile author s, the ranking of the selected social profile, and the date of ranking.

Steps 802-818 are performed to generate a list of selected/ranked social profiles that may be more relevant than the machine generated references. In an embodiment, steps 802-818 are performed once. In another embodiment, steps 802-818 are performed at certain fixed intervals. In another embodiment, events such as addition of a certain number of social profiles or a manual intervention may trigger steps 802-818.

In step 820, the server receives a selection of the first file identifier. Information about the related social profiles of the first file stored in a social network is retrieved in step 822. Information related to the selected/ranked social profiles related to the first file is presented to the user in step 824. Steps 820-824 are performed when a user selects the first file for display. Steps 818, 820, 822, and 824 are similar to steps 712, 714, 716, and 718 respectively. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Figure 9:
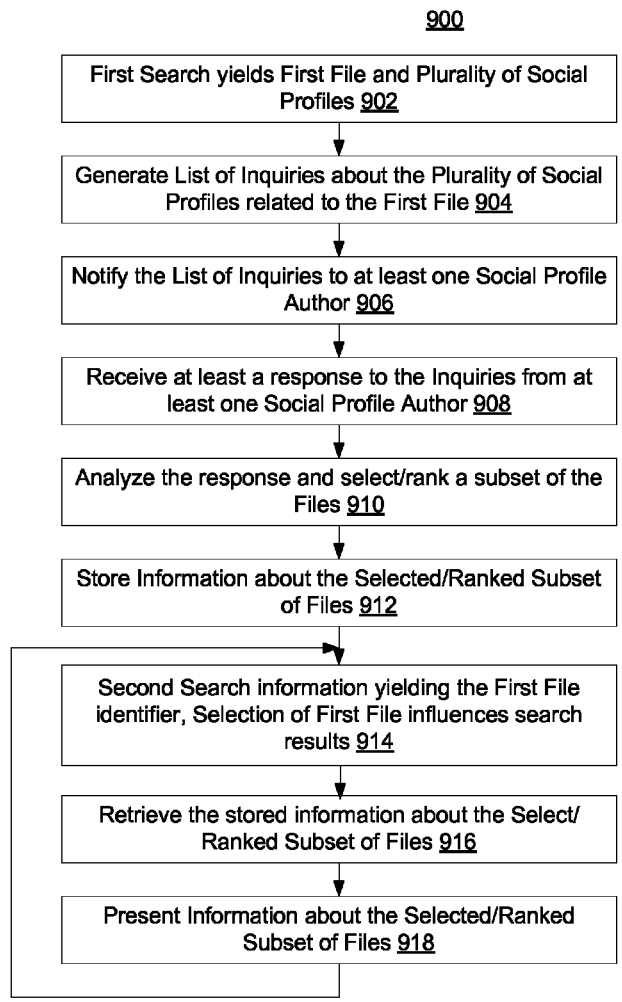
FIG. 9 is a flowchart of an example of a method of providing a list of related social profiles, where an author is involved in the selecting/ranking a subset of social profiles, where a search yields a first file.

FIG. 9 is a flowchart that includes the steps of an example of method 900 of providing a list of related social profiles, where an author provides input to selecting/ranking a subset of social profiles, and a search yields a first file. A first search in the social network using a search engine provides a list of social profiles related to the first file in step 902. In embodiment, the algorithm used to generate the search terms using Facebook Graph® API automatically extracts noun phrases from the first file using natural language processing tools and ranking them by the number of occurrences in the social profile compared to the number of occurrences on the web. In an embodiment, citation-validation is used to generate the list of related social profiles. For at least some embodiments, a list of inquiries is generated based on the social profiles related to the first file in step 904. The list of inquiries includes whether each social profile listed as related social profile from the search results is related to the first file and optionally the reason for being related.

In step 906, the list of inquiries is notified to one or more social profile authors. In step 908, method 900, receives at least one response from the social profile authors providing information about the relevancy of related social profiles to the first file and optionally the reason for a social profile being related in the opinion of the social profile author. In step 910, the related social profiles are ranked based on the number of selections from the social profile authors. In an embodiment, the response includes a ranked list of the related social profiles, identifying the relevance of the related social profiles to the first file. A subset of the ranked social profiles is selected. Information related to the subset of social profiles is stored in a database in step 912. Method 900 creates a hyperlink between the first file and the selected/ranked subset of social profiles. The hyperlink can influence the search results in the social network when the first file is involved. Steps 904, 906, 908, 910, and 912 may be similar to steps 704, 706, 708, 710 and 712.

Steps 902-912 are performed to generate a list of selected/ranked social profiles that may be more relevant than the machine generated referenced. In an embodiment, steps 902-912 are performed once. In another embodiment, steps 902-912 are performed at certain fixed intervals. In another embodiment, events such as addition of a certain number of social profiles or a manual intervention may trigger steps 902-912.

A second search in the social network using a search engine yields a first file and the server receives a selection of the first file identifier in step 914. The selection of the first file can influence the search results of future searches. The server retrieves information about the related social profiles (stored in step 912) from the social network in step 916. In an embodiment, in step 918, information about the related social profiles is presented to the user as shown in FIG. 2 and FIG. 3. In one embodiment, the identity of the authors who selected each social profile is revealed to the user by displaying metadata such as the author's name, institution, and qualifications. Steps 914, 916, and 918 may be similar to steps 714, 716 and 718. Steps 914, 916, and 918 are repeated for every search yielding the first file. In an embodiment, each of the steps of method 900 may be a distinct step. In other embodiments, method 900 may not have all of the above steps and/or may have other steps in addition to or instead of those listed above. The steps of method 900 may be performed in another order. Subsets of the steps listed above as part of method 900 may be used to form their own method. In an embodiment, there could be multiple instances of method 900.

Identifying Related Social Profiles

One or more social profiles related to a first file in the social network are identified by server 120 or server 420 or server 520. In the described embodiments, the first file can reside in author user system 1022, or in the social network 1020 or in server system 1002. The related social profiles are identified by natural language search, or text analysis, or from filtering, or any other search techniques. In an embodiment, server 120 or 420 or 520 extracts from noun phrases from social profiles in the social network using natural language processing tools and ranks them by the number of occurrences in the social profile compared to the number of occurrences on the social network. In an embodiment, the search terms are in the text of the citations in the first file. In another embodiment, the search terms are in the abstract or the full-text of the social profiles in the social network. In one embodiment, server 620 searches the social network using Facebook Graph® API to automatically extract noun phrases from social profiles using natural language processing tools and rank them by the number of occurrences in the social profile compared to the number of occurrences on the social network. In an embodiment, link-validation is used to generate the list of related social profiles.

In another embodiment, the Facebook "related profiles" method is used to identify the social profiles or papers published after the first file in a social network. On Facebook, related profiles are derived from text-analysis of social profiles, and a ranked list of social profiles that may be related is presented to the user. For each word or term in each social profile, a numeric weight is computed based on the number of times the word occurs in the social profile and the number of social profiles the term occurs in within the social network. The numeric-weight is used to find the most similar pairs of papers or social profiles.

Generation of List of Inquiries

In an embodiment, the list of inquiries generated by the system server includes one or more identified social profiles related to a first file. In an embodiment, the inquiries include the search terms used in a search using text analysis or filtering. In another embodiment, the list of inquires includes one or more identified social profiles and the noun-phrases from the first file used to identify the social profiles. In an embodiment, the list of inquiries presented to the first social profile author includes one or more titles of related of social profiles, the search term used to identify the related social profiles, the noun-phrases in the citations of the first file, the publication date, the abstract, and the unique identification. The list of inquiries to second social profile author is influenced by a response received from a first author. The list of inquiries to the second social profile author includes one or more of the selection of related social profiles by the first social profile author, the search terms used to identify the related social profile, the noun-phases used in citation-validation techniques, the abstract, the unique identification number and the publication date. In an embodiment, the list of inquiries includes one or more of the types of relationship tags of the identified social profile such as whether the identified social profile summarizes the first file, contradicts the first file, or complements the first file.

The list of inquires is notified electronically to one or more second social profile authors. The method of notification of the list of inquiries to the first social profile author and the second social profile authors comprises at least one of an email, messaging on a social network, instant message or a web-based interface notification.

In an embodiment, a questionnaire is generated by the system server includes one or more identified social profiles related to a first file. In an embodiment, the questionnaire includes whether the identified social profile is related to the first file. The questionnaire is notified to the author of the identified social profile. The method of notification of the questionnaire to the author of the identified social profile comprises at least one of an email, messaging on a social network, instant message or a web-based interface notification.

Selection and Ranking of Related Social Profiles

The related social profiles are ranked based on the number of selections from the social profile authors. In an embodiment, a selection of the related social profile from each social profile author is ranked equally. In another embodiment, selection of a social profile from the first social profile author receives higher ranking. In another embodiment, the selection of a social profile from a social profile author who responds to queries more often is ranked higher. In another embodiment, selection by the author designated for correspondence receives higher ranking. In an embodiment, all social profiles selected by the social profile authors are selected. In another embodiment, a certain number of the ranked social profiles are selected. In another embodiment, social profiles receiving a certain rank are selected.

An embodiment of a method of identifying social profiles in a social network having relevance to a first file, comprising identifying a plurality of social profiles within the social network, wherein the plurality of social profiles each have a relationship with the first file; generating, by a system server, a list of inquiries based on the plurality of social profiles; providing, by the system server, the list of inquiries to at least one author of the first file; receiving from the at least one author at least one response to the list of inquiries; selecting a subset of the plurality of social profiles based on the at least one response; and storing information related to the selected subset of the plurality of social profiles for access if the first file is selected.

An embodiment of a method further comprising generating, by the system server, a second list of inquiries based on the plurality of social profiles; providing, by the system server, the second list of inquiries to at least one second author of the plurality of social profiles; receiving from the at least one second author of the plurality of social profiles at least one second response to the second list of inquiries; re-selecting the subset of the plurality of social profiles based on the at least one response and the at least one second response; storing information related to the re-selected subset of the plurality of social profiles for access if the first file is selected.

An embodiment of a method further comprising providing, by the system server, the selected subset of the plurality of social profiles to a user that selects the first file and identifying the at least one author to the user.

An embodiment of a method wherein identifying the at least one author comprises providing the user with the at least one author's name, qualifications or institution. An embodiment of a method further comprising providing, by the system server, the selected subset of the plurality of social profiles to a user that selects the first file and identifying the at least one author of the first file, and the at least one author of the plurality of social profiles to the user, wherein identifying the at least one author comprises providing the user with the at one of a name, qualifications or institution of the at least one author. An embodiment of a method further comprising providing a hyperlink between the first file and the selected subset of the plurality of social profiles, wherein the hyperlink influences a ranking of search results that include at least one of the first file and the plurality of social profiles. An embodiment of a method wherein the plurality of social profiles are each identified by a plurality of subject-matter searches, wherein each search identifies one of the plurality of social profiles and the first file. An embodiment of a method wherein at least one of the plurality of subject-matter searches is refined by the at least one response.

An embodiment of a method wherein at least one of the plurality of subject-matter searches uses a keyword search application-programming interface to access records in a social network. An embodiment of a method wherein the list of inquiries includes search terms used in a search that identified the first file and the plurality of social profiles, thereby establishing a relationship between the first file and the plurality of social profiles by text analysis or filtering. An embodiment of a method wherein the search terms comprise strings of words. An embodiment of a method wherein the search terms comprise noun phrases. An embodiment of a method wherein the search terms comprise author names cited by the first file. An embodiment of a method wherein the search terms comprise a term within the first file.

An embodiment of a method the search is based on at least one of a word string, an author, or an image. An embodiment of a method wherein the search terms are included within text of links of the first file. An embodiment of a method wherein each of the plurality of social profiles include a publication date, wherein each of the publication dates are more recent than at least one of a first revision or a last revision date of the first file. An embodiment of a method wherein each of the plurality of social profiles includes a publication date, wherein each of the publication dates comprises a specific date. An embodiment of a method wherein each of the plurality of social profiles includes a publication date, wherein each of the publication dates comprises a date before a specific date. An embodiment of a method wherein the list of inquiries includes titles of at least a subset of the plurality of social profiles. An embodiment of a method wherein the list of inquiries includes authors of at least a subset of the plurality of social profiles. An embodiment of a method wherein the at least one author includes a first author and a second author, and wherein the list of inquiries for the first author is influenced by a response received from the second author. An embodiment of a method wherein the list of inquiries includes a relationship tag between at least one of the plurality of social profiles and the first file. An embodiment of a method where in the relationship tag comprises at least one question of whether the relationship of the at least one of the plurality of social profiles is supportive, contradictory or summarizing. An embodiment of a method wherein providing the list of inquiries to the at least one author of the first file comprises electronically communicating the list of inquires to the at least one author using a notification. An embodiment of a method wherein the notification comprises at least one of an email, messaging on a social network, or instant message. An embodiment of a method wherein the notification comprises a web-based interface notification.

An embodiment of a method wherein receiving from the at least one author at least one response to the list of inquiries comprises receiving a selected subset of the plurality of social profiles that the at least one author selects as being relevant to the first file. An embodiment of a method wherein receiving from the at least one author at least one response to the list of inquiries comprises receiving a ranked list of at least a subset of the plurality of social profiles that identifies an order of relevance of the at least the subset of the plurality of social profiles to the first file. An embodiment of a method further comprising providing the at least one inquiry based on one response to at least one other author; receiving from the at least one other author at least one second response to the at least one response; re-selecting the subset of the plurality of social profiles based on the at least one second response; storing information related to the re-selected subset of the plurality of social profiles for access if the first file is selected.

An embodiment of a method wherein the list of inquiries is provided to a plurality of authors, and responses received from each of the plurality of authors are compiled for selecting the subset of the plurality of social profiles. An embodiment of a method wherein a plurality of lists of inquiries are provided to a plurality of authors, and responses received from each of the plurality of authors are compiled for selecting the subset of the plurality of social profiles. An embodiment of a method further comprising the at least one author having a permission to edit the first file. An embodiment of a method for a server to identify social profiles having relevance to a first file, comprising receiving, by the server, a plurality of social profiles, wherein the plurality of social profiles were generated by a subject matter search; generating, by the server, a list of inquiries based on the plurality of social profiles; providing, by the server, the list of inquiries to an author of the first file, wherein the first file is a one of the plurality of social profiles; receiving, by the server, from the author at least one response to the list of inquiries; selecting, by the server, a subset of the plurality of social profiles based on the at least one response; storing, by the server, the selected subset of the plurality of social profiles for access if the first file is selected. An embodiment of a method further comprising providing, by the server, the selected subset of the plurality of social profiles to a user that selects the first file.

An embodiment of a system for identifying social profiles having relevance to a first file, comprising a server configured to present on a first display a list of inquiries to an identified author of a first file, wherein the list of inquiries is based on a plurality of social profiles; the server configured to receive from the identified author at least one response to the list of inquiries; the server configured to select a subset of the plurality of social profiles based on the at least one response; a server configured to present on a second display the selected subset of the plurality of social profiles to a user that selects the first file.

An embodiment of a programmable storage device readable by a machine, tangibly embodying a program of instructions when executed by the machine to perform a method of identifying social profiles of a social network having relevance to a first file, the method comprising: identifying a plurality of social profiles within the social network, wherein the plurality of social profiles each have a relationship with the first file; generating, by a system server, a list of inquiries based on the plurality of social profiles; providing, by the system server, the list of inquiries to at least one author of the first file; receiving from the at least one author at least one response to the list of inquiries; selecting a subset of the plurality of social profiles based on the at least one response; storing information related to the selected subset of the plurality of social profiles for access if the first file is selected.

An embodiment of a method of identifying social profiles of a social network having relevance to a first file, comprising: identifying a plurality of social profiles within the social network, wherein the plurality of social profiles each have a relationship with the first file; generating, by a system server, a first list of inquiries based on the plurality of social profiles; providing, by the system server, the first list of inquiries to at least one author of the first file; receiving from the at least one author of the plurality of social profiles at least one first response to the first list of inquiries; generating, by the system server, a second list of inquiries based on the plurality of social profiles; providing, by the system server, the second list of inquiries to at least one second author of the plurality of social profiles; receiving from the at least one second author of the plurality of social profiles at least one second response to the second list of inquiries; selecting a subset of the plurality of social profiles based on the at least one first response and the at least one second response; storing information related to the selected subset of the plurality of social profiles for access if the first file is selected. An embodiment of a method wherein the information related to the selected subset of the plurality of social profiles comprises an opinion of the at least one author of either the first file or the plurality of social profiles. An embodiment of a method further comprises providing the opinion of the at least one author to a user that selects the first file.

System

Figure 10:
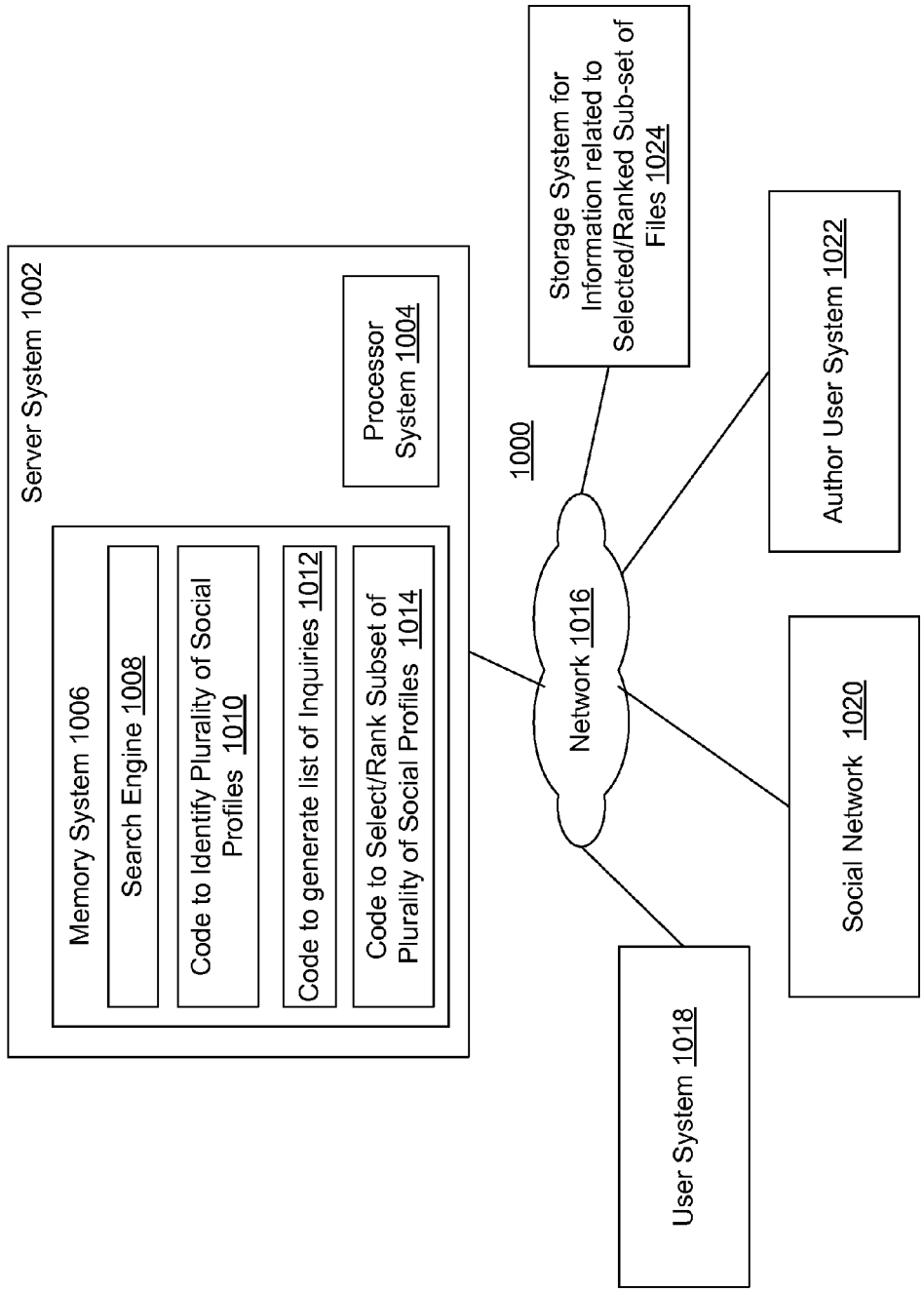
FIG. 10 shows the block diagram of an example system of providing related social profiles to a search result in a social network.

FIG. 10 shows a block diagram of system 1000, an embodiment of a system of providing related social profiles to a search result. The system consists of server system 1002, network 1016, user system 1018, social network 1020, author user system 1022, and storage system for information related to selected/ranked subset of social profiles 1024 among others. In other embodiments, system 1000 may not have all of the elements or features listed and/or may have other elements or features instead of or in addition to those listed.

As shown in FIG. 10, for the described embodiments, server system 1002 includes processor system 1004 and memory system 1006 among others. Server system 1002 consists of on one or more servers connected to the network. Server system 1002 can be a single unit, distributed in various locations, or virtualized. Processor system 1004 may include any one of, some of, any combination of, or all of multiple parallel processors, a single processor, a system of processors having one or more central processors and/or one or more specialized processors dedicated to specific tasks. Also, processor system 1004 may include one or more Digital Signal Processors (DSPs) in addition to or in place of one or more Central Processing Units (CPUs) and/or may have one or more digital signal processing programs that run on one or more CPU.

Memory system 1006 may include, for example, any one of, some of, any combination of, or all of a long-term storage system, such as a hard drive; a short-term storage system, such as random access memory; a removable storage system, such as a floppy drive or a removable drive; and/or flash memory. Memory system 1006 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 1006 stores code for search engine 1008, code to identify plurality of social profiles 1010, code to generate a list of inquiries/questionnaire 1012, and code to select/rank subset of plurality of social profiles 1014. In an embodiment, memory system 1006 stores code for search engine 1006 to search the social network for social profiles related to a first file and returns the result to server system 1002. In the described embodiments, the first file can reside in the social network 1020, or author user system 1022, or storage system for information related to selected/ranked subset of social profiles 1024 or memory system 1006 or any other storage system. In an embodiment, the search engine searches the abstract of the social profile. In another embodiment, the search engine searches the entire social profile for keywords. The results from the search engine are ranked in order of relevancy. The relevancy may be the number of times the keyword appears in the social profile, and the number of hyperlinks.

The keywords for searching related social profiles are supplied by the code to identify plurality of social profiles 1010. The keywords may be all of or some of frequently used noun phrases, the author of the first file, the authors listed in the references cited in the first file, words from the title, publication date, words related to subject matter. Once the server receives the list of social profiles related to the first file, an inquiry is automatically generated by code to generate a list of inquiries 1012 and sent to one or more authors of social profiles. The list of inquiries is based on the search results. The inquiries include the relevancy of each of the social profiles listed as a related social profile to the first file, the reason for the social profile being related to the first file. Code to select/rank subset of plurality of social profiles 1014, selects a subset of the social profiles from search results, stores information about the selected subset of social profiles, and provides a hyperlink between the first file and the selected subset of social profiles. Selection of social profiles may also include ranking the social profiles based on the number of selection from the social profile authors. In an embodiment, responses from different social profile authors can have different weight. Information related to the selected/ranked subset of social profiles is stored. In an embodiment, the information related to the selected/ranked subset of social profiles is stored on a storage system for information related to selected/ranked subset of social profiles 1024. In another embodiment, the information related to the selected/ranked subset of social profiles is stored in memory system 1006. In another embodiment, the information related to the selected/ranked subset of social profiles is stored in the social network 1020. In an embodiment, a hyperlink is created between the first file and the selected subset of social profiles. The hyperlink influences the ranking of search results by the search engine when the first file is involved.

Network 1016 is a network and/or combination of networks of devices that communicate with one another within an enterprise or on the Internet. User system 1018 is a user device connected to the network 1016. User system 1018 selects a social profile from the social network. The social profile is selected from a search result or from a listing of social profiles. Social network 1020 is a shared social network. All users can access the social network to read and in some cases contribute to the social profile system. Author user system 1022 is a user system in the network. The author user system has read and write access to social profiles in social network 1020. An author of a social profile may be an author of the social profile, co-author of the social profile, an expert in the subject matter or a team member. An embodiment includes a programmable storage device (such as memory system 1002) readable by a machine (such as, processor system 1004), tangibly embodying a program of instructions when executed by the machine to perform a method of identifying one or more social profiles in a social network related to a first file. The method includes identifying a plurality of social profiles within the social network, wherein the plurality of social profiles each have a relationship with the first file, wherein the social network allows uploading and sharing of social profiles of users, and wherein each social profile includes a representation of a user. The method further includes generating, by a system server, a list of inquiries based on the plurality of social profiles, providing, by the system server, the list of inquiries to at least one author of the first file, receiving from the at least one author at least one response to the list of inquiries, selecting a subset of the plurality of social profiles based on the at least one response, and storing information related to the selected subset of the plurality of social profiles for access if the first file is selected.

Although specific embodiments have been described and illustrated, the described embodiments are not to be limited to the specific forms or arrangements of parts so described and illustrated.

The invention claimed is:

1. A method of identifying social profiles in a social network having relevance to a first file, comprising:

identifying a plurality of social profiles within the social network, wherein the plurality of social profiles each have a relationship with the first file, wherein the social network allows uploading and sharing of social profiles of users, and wherein each social profile includes a representation of a user;

generating, by a system server, a list of inquiries based on the plurality of social profiles;

providing, by the system server, the list of inquiries to at least one author of the first file;

receiving from the at least one author at least one response to the list of inquiries;

selecting a subset of the plurality of social profiles based on the at least one response; and storing information related to the selected subset of the plurality of social profiles for access if the first file is selected;

generating, by the system server, a second list of inquiries based on the plurality of social profiles;

providing, by the system server, the second list of inquiries to at least one second author of the plurality of social profiles;

receiving from the at least one second author of the plurality of social profiles at least one second response to the second list of inquiries;

re-selecting the subset of the plurality of social profiles based on the at least one response and the at least one second response;

storing information related to the re-selected subset of the plurality of social profiles for access if the first file is selected.

2. The method of claim 1, further comprising providing the re-selected subset of the plurality of social profiles or the selected subset of the plurality of social profiles to a user that selects the first file; and identifying the at least one second author or the at least one author to the user.

3. The method of claim 2, wherein identifying the at least one second author or the at least one author comprises providing the user with a name, qualifications or institution of the at least one second author or the at least one author.

4. The method of claim 1, further comprising providing a hyperlink between the first file and the selected subset of the plurality of social profiles, wherein the hyperlink influences a ranking of search results that include at least one of the first file and the plurality of social profiles.

5. The method of claim 1, wherein the plurality of social profiles are each identified by a plurality of subject-matter searches, wherein each search identifies one of the plurality of social profiles and the first file.

6. The method of claim 5, wherein at least one of the plurality of subject-matter searches is refined by the at least one response.

7. The method of claim 5, wherein at least one of the plurality of subject-matter searches uses a keyword search application programming interface to access records in a social network.

8. The method of claim 1, wherein the list of inquiries includes search terms used in a search that identified the first file and the plurality of social profiles, thereby establishing a relationship between the first file and the plurality of social profiles by text analysis or filtering.

9. The method of claim 1, wherein each of the plurality of social profiles include a publication date, wherein each of the publication dates are more recent than at least one of a first revision or a last revision date of the first file.

10. The method of claim 1, wherein the list of inquiries includes titles of at least a subset of the plurality of social profiles.

11. The method of claim 1, wherein the list of inquiries includes the at least one author of at least a subset of the plurality of social profiles.

12. The method of claim 1, wherein the list of inquiries is for the first author, and is influenced by a response received from the second author.

13. The method of claim 1, wherein the list of inquiries includes a relationship tag between at least one of the plurality of social profiles and the first file.

14. The method of claim 13, where in the relationship tag comprises at least one question of whether the relationship of the at least one of the plurality of social profiles is supportive, contradictory or summarizing.

15. The method of claim 1, wherein providing the list of inquiries to the at least one author of the first file comprises electronically communicating the list of inquires to the at least one author using a notification.

16. The method of claim 1, wherein receiving from the at least one author at least one response to the list of inquiries comprises receiving a selected subset of the plurality of social profiles that the at least one author selects as being relevant to the first file.

17. The method of claim 1, wherein receiving from the at least one author at least one response to the list of inquiries comprises receiving a ranked list of at least a subset of the plurality of social profiles that identifies an order of relevance of the at least the subset of the plurality of social profiles to the first file.

18. The method of claim 1, wherein the list of inquiries is provided to a plurality of authors, and responses received from each of the plurality of authors are compiled for selecting the subset of the plurality of social profiles.

19. The method of claim 1, further comprising the at least one author having a permission to edit the first file.

20. A method for a server to identify social profiles having relevance to a first file, comprising:

receiving, by the server, a plurality of social profiles, wherein the plurality of social profiles were generated by a subject matter search;

generating, by the server, a list of inquiries based on the plurality of social profiles;

providing, by the server, the list of inquiries to an author of the first file, wherein the first file is a one of the plurality of social profiles;

receiving, by the server, from the author at least one response to the list of inquiries;

selecting, by the server, a subset of the plurality of social profiles based on the at least one response;

storing, by the server, the selected subset of the plurality of social profiles for access if the first file is selected;

generating, by the system server, a second list of inquiries based on the plurality of social profiles;

providing, by the system server, the second list of inquiries to at least one second author of the plurality of social profiles;

receiving from the at least one second author of the plurality of social profiles at least one second response to the second list of inquiries;

re-selecting the subset of the plurality of social profiles based on the at least one response and the at least one second response;

storing information related to the re-selected subset of the plurality of social profiles for access if the first file is selected.

* * * * *